April 26, 1949.  J. BLUE  2,468,023
SEED PLANTER
Filed Feb. 5, 1947  3 Sheets-Sheet 1
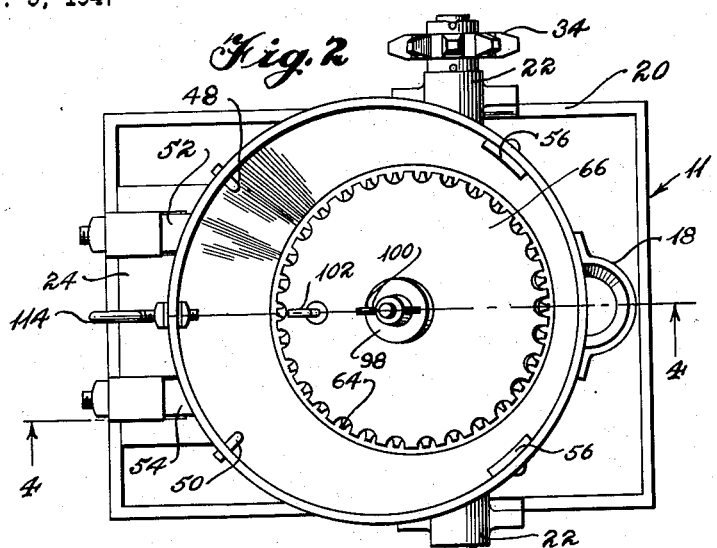
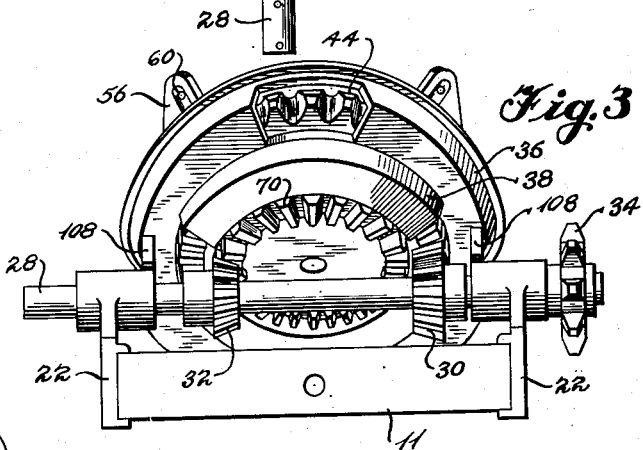
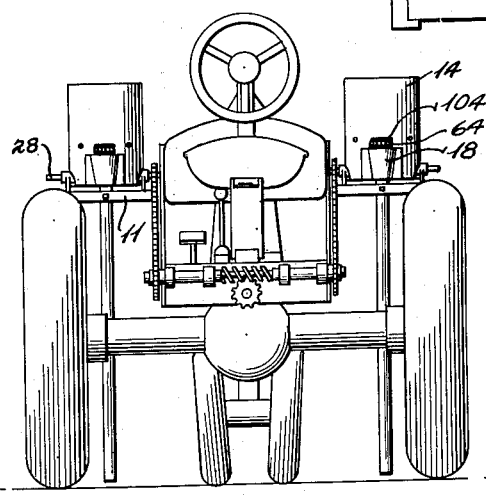
Inventor
John Blue
By Cushman, Darby & Cushman
Attorneys

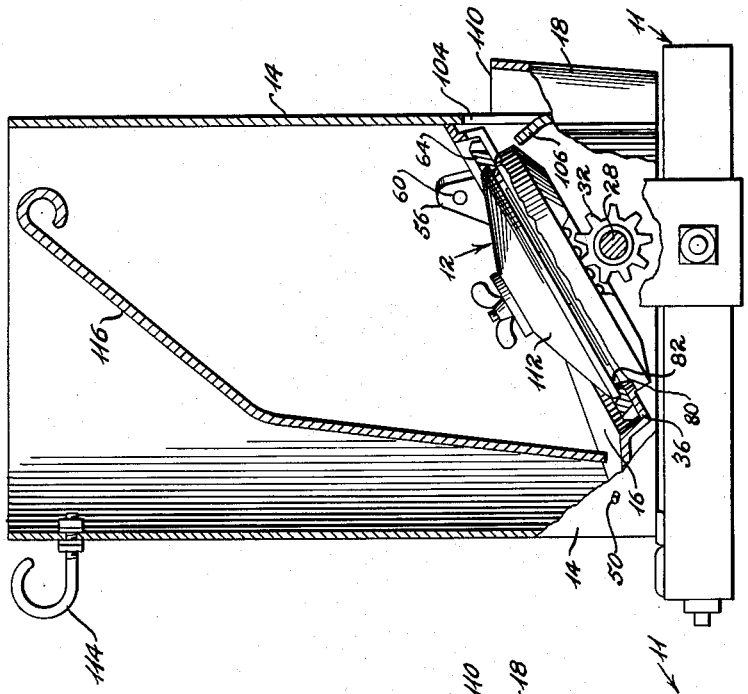

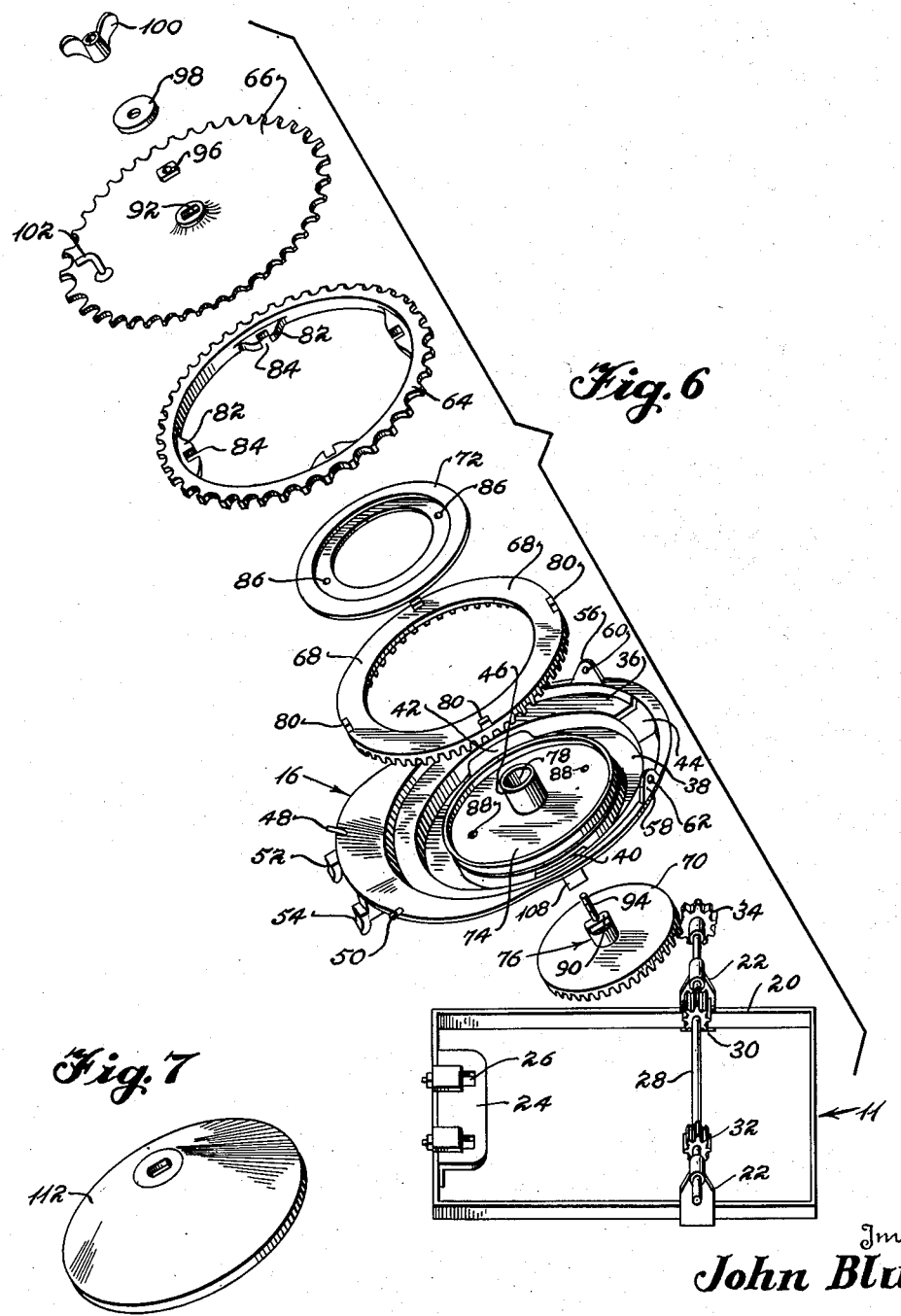

Patented Apr. 26, 1949

2,468,023

UNITED STATES PATENT OFFICE 2,468,023

SEED PLANTER

John Blue, Laurinburg, N. C., assignor to John Blue Company, Laurinburg, N. C., a corporation of North Carolina Application February 5, 1947, Serial No. 726,653

2 Claims. (Cl. 222—239)

1

This invention relates to seed planters and is particularly concerned with planters of the axle-driven type which may be used for the planting of cotton seed, corn, peanuts and similar seeds, which require special handling and also any other general type of seed.

A principal object of this invention is to provide a new seed planting mechanism of the indicated type. A further object is the provision of seed planters possessing the following features:

(1) Easy separation of the seed distributor mechanism from the planter mounting and planter hopper.

(2) Readily interchangeable seed distributor parts adapting the planter for use with cotton seeds or similar seeds requiring separation prior to distribution, peanuts or similar seeds which require gentle handling during the distribution, and other seeds which require no special handling in the distributing operation.

(3) Provision for permitting an operator of the mechanism to view the discharge of seeds from the hopper into a discharge tube during planting.

(4) A seed agitator disk mounted separately from and driven independently of a seed metering disk.

Still further objects will become apparent from the detailed description given hereinafter.

For an understanding of the means by which these objects are accomplished and the construction of my seed planter, reference is made to the attached drawings, in which Figure 1 is a diagrammatic view of two of my seed planters mounted for operation upon a tractor, the illustration showing the appearance of this arrangement when viewed from the rear of the tractor.

Figure 2 is a top elevational view of my planter.

Figure 3 is a rear elevational view of the planter mounting, hopper bottom and seed metering mechanism, i. e., a rear view of the planter with the hopper removed.

Figure 4 is a vertical sectional view taken along the line 4—4 of Figure 2.

Figure 5 is a vertical view, partly in section, showing features of the planter not fully apparent from Figure 4.

Figure 6 is an exploded view of the planter mounting, hopper bottom and seed metering mechanism.

Figure 7 is a cover plate for the seed metering disk which is used with the planter when the seed agitator disk is not employed.

Referring in detail to the drawings, the seed planter consists of the primary units of a planter base 11, a seed metering mechanism 12, a hopper 14, a hopper bottom 16, and a discharge tube 18.

The base 11 serves as a means for mounting the planter upon a suitable carriage when not in use. It will be apparent that my planter may be used singly or in multiples and may be mounted on any suitable carriage whether it be horse-drawn, tractor-drawn, tractor-mounted, or drawn by any other suitable mechanism. The general method of mounting and the appearance of the planter when in use, can be gathered from the diagrammatic illustration of Figure 1 in the drawings. This figure shows two planters mounted upon the forward section of a tractor so as to be driven by chains from sprocket gears connected to the power take-off of the tractor. Obviously, there exist innumerable ways in which my planter can be satisfactorily mounted on tractors or other carriages and numerous ways for supplying the necessary power to drive them. These different ways of mounting will be apparent to those who are familiar to the use of planters and Figure 1 is merely included so as to provide a general understanding of the appearance of the planter during operation. This figure shows the seed viewing arrangement of the planter as is more fully discussed hereinafter.

The planter base 11 comprises an open rectangle of strip steel or other suitable metal 20 having flanges 22 protruding upward therefrom. On one end of the base is mounted a hinge member 24 provided with a plurality of openings 26 which receive corresponding hinge members of the hopper bottom. A shaft 28 is journalled in the flanges 22 and two spur gears 30 and 32 are fastened, such as by a key or by a pin, to the shaft 28. A sprocket wheel or spur gear 34 is provided for driving the shaft 28. The sprocket 34 is preferably mounted upon the shaft 28 by means of cotter pins or similar easily removable fastening elements so that it may be placed on either end of the shaft 28 depending upon which side of the planter it is most desirable to drive the planter from during use.

The hopper bottom 16 which can be made from cast steel, cast iron or similar material, is dish-like in structure and contains two channels 36 and 38. The inner channel 38 is situated at a lower level than the channel 36. Two holes 40 and 42 are provided in the channel 38. A hole 44 is provided in the channel 36. Positioned near the center of the bottom 16 is a cylindrical protrusion 46 which serves to journal a shaft extension from one of the ring gears driving the seed distributor mechanism. The hopper bottom 16 is also provided at one end with two pins 48 and 50, at the same end with two hinge members 52 and 54 and at the opposite side with two upwardly extending flanges 56 and 58 having small holes 60 and 62.

The seed metering mechanism 12 comprises a seed metering disk 64, a seed agitator disk 66, a seed metering disk driving gear 68, an agitator disk driving gear 70 and a retainer and spacer plate 72.

The ring gear 68 which drives the seed distributor ring fits into the channel 36. It will be seen that when the ring gear 68 is inserted in the channel 36, the teeth of the gear 68 can mesh with the teeth of the spur gear 30 through the opening 42 in the channel 36. This is most apparent in Figure 3. By changing the position of gears 32 and 30 upon the shaft 28, the gear 68 can be made to mesh with the gear 30 through the hole 40 in the channel 38.

The ring gear 70 fits into the indentation 74 of the bottom 16 and the shaft 76 which extends from the ring gear 70 passes through the opening 78 in the cylindrical protrusion 46. The spur gear 32 is so positioned upon the shaft 28 that the teeth of the gear 32 mesh with the teeth of the gear 70 when the bottom 16 is operatively positioned upon the base 11.

From a consideration of the drawings and in particular Figure 3, it will be seen that that when the shaft 28 is caused to rotate, such as by means of a driving chain on the sprocket 34, the spur gear 30 will cause the ring gear 68 to rotate in one direction while the ring gear 70 is caused to rotate in an opposite direction by means of the spur gear 32.

The ring gear 68 is provided with a plurality of lugs 80. The seed metering disk 64 is provided with a plurality of flanges 82, each of which, in turn, is provided with openings 84. The position and shape of the openings 84 on the disk 64 are made to correspond with the size, shape and position of the lugs 80, extending from the ring gear 68. The disk 64 fits into the channel 36 of the hopper bottom 16. As can be seen in Figure 4, the lugs 80 will be associated with the openings 84 of the disk 64 when the gear 68 and the disk 64 are properly positioned in their respective channels in the base 16. The ring gear 68 is held into position in the channel 38 by means of the retaining plate 72 which is fastened to the bottom 16, such as by screws and bolts placed through the openings 86 in the retaining plate and the holes 88 in the hopper bottom.

When the ring gear 68 is caused to rotate, as indicated above, the seed metering disk 64 will be also rotated because of its connection with the gear 68 through the lugs 80.

A rectangular portion 90 is provided on the shaft 74 extending from the ring gear 70. This rectangular portion 90 corresponds to a rectangular opening 92 located in the center of the agitator disk 66. In operation, the ring gear 70 is positioned within the bottom 16, so that the shaft 74 extends through the opening 78. With the ring gear 68 and seed metering disk 64 positioned in their respective channels in the hopper bottom, as described above, the seed agitator disk 66 is placed over the whole assembly with the extension 90 protruding into the opening 92 of the disk 66. The gear 70 and disk 66 are held in position by means of a bolt 94, washers 96 and 98, and wing nut 100, the bolt 94 extending through an opening provided therefor in the center of the shaft 74 of the gear 70.

The appearance of this assembly of parts is most clearly illustrated in Figure 3. As has been indicated, the gear 70 will be caused to rotate in a direction opposite to the gear 68 during operation of the planter. Since the seed metering disk is driven by the gear 68 and the agitator disk 66 is driven by the gear 70 through the shaft 74, the disk 64 and disk 66 will be caused to rotate in opposite directions.

The action of the agitator disk 66 is supplemented with an L-shaped rod 102, located near the outside edge of the disk. The disk 66 and the agitator 102 function to separate seeds, such as cotton seed, and to insure a continuous supply of the seed to the seed metering disk 64 when the planter is in use.

The hole 44 in the channel 36 of the base 16 serves to connect the inside of the hopper 14 with the seed discharge tube 18. As will be seen in Figure 3, when the seed metering disk 64 is properly positioned in its channel in the base 16, the uppermost position of the disk 64 corresponds in position to the hole 44.

An opening 104 is provided in the back-side of the hopper 14. At the bottom of the opening 104, there is located an inwardly extending flange 106.

As can be seen from Figures 4 and 5, the bottom 16 is made in such shape that the back portion of the bottom is located at considerable distance up the side of the hopper 14 when the bottom and the hopper are in proper position. Lugs 108 are provided on the base of bottom 16. In use, these lugs rest upon the flanges 22 and help to hold the bottom 16 in proper position. The parts of the planter are also so positioned that the seed metering mechanism 12 is pitched forward at an appreciable angle when the parts of the planter are in operating position.

The disk 64, the hole 44, the opening 104 and the top of the seed discharge tube 18 are so positioned one to another in the planter that the portion of the disk 64 located at the hole 44 is intermediate between the uppermost extension of the opening 104 and the topmost part 110 of the seed discharge tube 18. This arrangement of elements provides a viewing opening or window for the planter through which seeds, which are discharged from the disk 64 into the discharge tube 18, may be viewed from behind, by a person using the planter, such as a person seated upon a tractor with the planter mounted in front of him. This feature of my planter is most apparent in Figure 1 of the drawings, where the disk 64 can be seen through the opening 104 above the top edge of the discharge tube 18.

An important feature of my planter is the ease with which it may be disassembled for cleaning or repair. The remainder of the planter can readily be removed from the base 11 by simply rotating the hopper and connected parts from the base about hinge elements 52 and 54, so as to disengage the gears 30 and 32 from the gears 68 and 70 and then lifting this portion of the planter free of the base. This leaves the base 11 as illustrated at the bottom of Figure 6 of the drawing.

The hopper 14 of the planter and the discharge tube 18 which is permanently connected to the hopper, such as by welding or rivets, can be easily disconnected from the bottom 16. This is accomplished by removing the fastening elements, such as screws, pins or the like, inserted through the holes 60 in the lugs 56 and corresponding holes in the hopper. The bottom 16 and seed metering mechanism 12 are then lifted up and out of the hopper, at the same time disengaging the hopper from the pins 48 and 50 which extend through corresponding holes in the hopper.

All of the parts of the seed metering mechanism may likewise be readily disassembled. In order to remove the agitator disk 66, it is only necessary to remove the wing nut 100 and washer 96 and 98 from the bolt 94 and then lift the disk 66 away from the assembly. This leaves free the disk 64 which may be lifted from engagement with the lugs 80 of the gear 68. The gear 68 is, in turn, removed by removing the bolts which hold the retaining plate 72 onto the bottom 16. With the base 11 separated from the bottom 16, the gear 70 may be removed when the nut 100 is removed from the bolt 94.

In order to change over the planter from operation of planting material, such as cotton seed, so as to use it for the planting material, such as peanuts, it is necessary to remove the agitator disk 66 in the manner indicated above, and replace the disk 66 with a cover plate 112, such as that shown in Figure 7.

The general operation of my planter may be more fully understood by the following description of its operation for the planting of cotton seeds. With the planter properly mounted, as illustrated in Figure 1, the hopper 14 is filled with seeds. With the tractor running along the rows, the metering disk 64 will be rotated in one direction and the agitator disk 66 in the opposite direction, as has been described above. The rotation of the disk 66 and the agitator 102 cause the cotton seed to disperse and to fill up the teeth-like portions of the seed metering disk 64. As the disk 64 rotates, seeds will come successively into position at the hole 44. When the seeds reach this point, they will drop and be deflected by the flange 106 into the seed discharge tube 18. As they come into the opening and are so discharged, they can be viewed by the operator from behind, as has been indicated above.

During use in the field, the operation of the planter can be instantly stopped, even though the movement of the carriage is continued, by lifting the remainder of the planter sufficiently from the base 11, so as to disengage the gears 68 and 70 from the gears 30 and 32. A hook 114 is provided at the top on the front of the hopper so that a chain or similar connection may be attached thereto. By pulling on the chain attached to the hook, the remainder of the planter will be caused to lift about the hinge 24, so that the gears will disengage as required and stop the operation of the planter.

I claim:
1. A seed planter comprising a base having upwardly extending flanges, a shaft journalled in said flanges, two spur gears on said shaft, a hopper, a hopper bottom, two inclined channels in said bottom, a ring gear rotatably carried in the lowest of said channels, said ring gear directly engaging one of said spur gears through a hole in the channel in which it is carried, a seed metering disk carried in the other channel and rotated by said ring gear, an agitator disk positioned over the metering disk, said agitator disk being rotated opposite to the metering disk, through a ring gear held by a shaft extending from this ring gear on the underside of said bottom engaged with the other of said spur gears.

2. A seed planter comprising a base having upwardly extending flanges, a shaft journalled in said flanges, two spur gears on said shaft, a hopper, a hopper bottom, two inclined channels in said bottom, a ring gear rotatably carried in the lowest of said channels, said ring gear directly engaging one of said spur gears through a hole in the channel in which it is carried, a seed metering disk carried in the other channel and rotated by said ring gear, an agitator disk positioned over the metering disk, said agitator disk being rotated opposite to the metering disk through a ring gear carried on the underside of said bottom engaging the other of said spur gears held by a shaft extending from the ring gear, a discharge tube positioned on the side of the hopper, and an opening in the side of the hopper, the relative positions of said metering disk, hopper, opening, hole, and tube, one to another, being such that a seed discharged from said disk through said hole and opening into said tube may be observed to enter the tube from behind the planter during operation.

JOHN BLUE.

REFERENCES CITED

The following references are of record in the file of this patent:

UNITED STATES PATENTS

| Number | Name | Date |
|---|---|---|
| 131,253 | Culley | Sept. 10, 1872 |
| 200,490 | Underhill | Feb. 19, 1878 |
| 261,418 | Ayers | July 18, 1882 |
| 361,403 | Follmer | Apr. 19, 1887 |
| 376,534 | Lynch | Jan. 17, 1888 |
| 1,487,919 | Cole | Mar. 25, 1924 |
| 1,613,831 | Huntington et al. | Jan. 11, 1927 |
| 2,017,759 | Kriegbaum et al. | Oct. 15, 1935 |